US012604018B2

(12) United States Patent
Ryder et al.

(10) Patent No.: US 12,604,018 B2
(45) Date of Patent: Apr. 14, 2026

(54) CONVENTIONAL AND NEURAL NETWORK CODECS FOR RANDOM ACCESS VIDEO CODING

(71) Applicant: QUALCOMM Incorporated, San Diego, CA (US)

(72) Inventors: Thomas Alexander Ryder, San Diego, CA (US); Samuel James Eadie, Munich (DE); Marta Karczewicz, San Diego, CA (US); Muhammed Zeyd Coban, Carlsbad, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/744,171

(22) Filed: Jun. 14, 2024

(65) Prior Publication Data

US 2025/0016339 A1 Jan. 9, 2025

Related U.S. Application Data

(60) Provisional application No. 63/511,836, filed on Jul. 3, 2023.

(51) Int. Cl.
| | |
|---|---|
| *H04N 19/31* | (2014.01) |
| *H04N 19/107* | (2014.01) |
| *H04N 19/167* | (2014.01) |
| *H04N 19/176* | (2014.01) |

(52) U.S. Cl.
CPC ........... *H04N 19/31* (2014.11); *H04N 19/107* (2014.11); *H04N 19/167* (2014.11); *H04N 19/176* (2014.11)

(58) Field of Classification Search
None
See application file for complete search history.

(56) References Cited

U.S. PATENT DOCUMENTS

2021/0127140 A1* 4/2021 Hannuksela ........... G06N 3/084

OTHER PUBLICATIONS

Agustsson E., et al., "Scale-space Flow for end-to-end Optimized Video Compression", IEEE/CVF Conference on Computer Vision and Pattern Recognition (CVPR), 2020, pp. 8503-8512.

(Continued)

*Primary Examiner* — Christopher G Findley
(74) *Attorney, Agent, or Firm* — Shumaker & Sieffert, P. A.

(57) ABSTRACT

An example device for decoding video data includes a processing system comprising one or more processors implemented in circuitry and configured to: determine that a first temporal layer identifier of a first picture of the video data is included in a first set of temporal layers; in response to the first temporal layer identifier being included in the first set of temporal layers, decode blocks of the first picture on a block by block basis; determine that a second temporal layer identifier of a second picture of the video data is included in a second set of temporal layers, the second set of temporal layers being higher than the first set of temporal layers; and in response to the second temporal layer identifier being included in the second set of temporal layers, execute a neural network-based video decoder to decode the second picture.

20 Claims, 12 Drawing Sheets

(56)        References Cited

OTHER PUBLICATIONS

Blau Y., et al., "The Perception-Distortion Tradeoff", IEEE/CVF Conference on Computer Vision and Pattern Recognition, 2018, pp. 6228-6237.

Duan L-Y., et al., "Video Coding for Machines: A Paradigm of Collaborative Compression and Intelligent Analytics", arXiv:2001. 03569v2 [cs.CV] Jan. 13, 2020, pp. 1-15.

Hu Z., et al., "FVC: A New Framework towards Deep Video Compression in Feature Space", arXiv:2105.09600v2 [eess.IV] Aug. 23, 2021, pp. 1502-1511.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Li J., et al., "Deep Contextual Video Compression", 35th Conference on Neural Information Processing Systems (NeurIPS), 2021, 12 Pages.

Li J., et al., "Hybrid Spatial-Temporal Entropy Modelling for Neural Video Compression", arXiv:2207.05894v1 [eess.IV], Jul. 13, 2022, 17 Pages.

Lu G., et al., "DVC: An End-to-end Deep Video Compression Framework ", IEEE/CVF Conference on Computer Vision and Pattern Recognition (CVPR), 2019, pp. 11006-11015.

Mentzer F., et al., "High-Fidelity Generative Image Compression", 34th Conference on Neural Information Processing Systems (NeurIPS), Vancouver, Canada, arXiv:2006.09965v3 [eess.IV] Oct. 23, 2020, 20 Pages.

Mentzer F., et al., "VCT: A Video Compression Transformer", arXiv:2206.07307v2 [cs.CV] Oct. 12, 2022, 36th Conference on Neural Information Processing Systems (NeurIPS 2022), pp. 1-19.

Rippel O., et al., "ELF-VC: Efficient Learned Flexible-Rate Video Coding", IEEE/CVF International Conference on Computer Vision (ICCV), 2021, pp. 14479-14488.

Rozendaal T.V., et al., "Instance-Adaptive Video Compression: Improving Neural Codecs by Training on the Test Set", arXiv:2111. 10302v2 [eess.IV] Jun. 23, 2023, Qualcomm Technologies, pp. 1-29.

Zhang R., et al., "The Unreasonable Effectiveness of Deep Features As a Perceptual Metric", arXiv:1801.03924v2 [cs.CV] Apr. 10 Proceedings of the IEEE Conference on Computer Vision and Pattern Recognition, 2018, pp. 586-595.

International Search Report and Written Opinion—PCT/US2024/ 034930—ISA/EPO—Oct. 9, 2024 11 Pages.

Liu Z (Tencent)., et al., "AHG11: NN-Based Reference Frame Interpolation for VVC Hierarchical Coding Structure", 24. JVET Meeting, Oct. 6, 2021-Oct. 15, 2021, Teleconference, The Joint Video Exploration Team of ISO/IEC JTC1/SC29/WG11 and ITU-T SG. 16, No. JVET-X0060-V3, m57853, Oct. 6, 2021, 6 Pages, XP030297902, the whole document.

Zhu Z., et al., "Deep Inter Prediction via Reference Frame Interpolation for Blurry Video Coding", 2021 International Conference on Visual Communications and Image Processing (VCIP), IEEE, Dec. 5, 2021, 5 Pages, XP034069395, the whole document.

* cited by examiner

100

DECODED VIDEO

BLOCK-BASED VIDEO DECODER 300A

ENCODED VIDEO BITSTREAM

CPB MEMORY 320

ENTROPY DECODING UNIT 302

PREDICTION PROCESSING UNIT 304

MOTION COMPENSATION UNIT 316

INTRA-PREDICTION UNIT 318

INVERSE QUANTIZATION UNIT 306

INVERSE TRANSFORM PROCESSING UNIT 308

310

FILTER UNIT 312

DPB 314

RECEIVE ENTROPY CODED
DATA FOR CURRENT BLOCK ⌐400

ENTROPY DECODE DATA TO
DETERMINE PREDICTION AND
REPRODUCE COEFFICIENTS ⌐402

PREDICT CURRENT BLOCK ⌐404

INVERSE SCAN REPRODUCED
COEFFICIENTS ⌐406

INVERSE QUANTIZE AND
INVERSE TRANSFORM
COEFFICIENTS TO PRODUCE
RESIDUAL BLOCK ⌐408

COMBINE PREDICTED BLOCK
AND RESIDUAL BLOCK ⌐410

CONVENTIONAL AND NEURAL NETWORK CODECS FOR RANDOM ACCESS VIDEO CODING

This application claims the benefit of U.S. Provisional Application No. 63/511,836, filed Jul. 3, 2023, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data using a combined conventional encoder/decoder and a neural encoder/decoder. For example, a combined encoder may encode certain temporal layers of video data using a conventional encoder and other temporal layers using a neural network-based video encoder. Similarly, a combined decoder may decode certain temporal layers of video data using a conventional decoder and other temporal layers using a neural network-based video decoder.

In particular, conventional decoding techniques include prediction of blocks of video data and coding of residual blocks, where the residual blocks represent differences between prediction blocks and the original blocks of video data. Thus, a video coder may code blocks of pictures of a first set of temporal layers using prediction and residual coding. That is, for the blocks of the pictures of the first set of temporal layers, the video coder may form prediction blocks using, e.g., one of inter-prediction, intra-prediction, intra-block copy (IBC), affine prediction, or the like. The video coder may also code (encode or decode) residual blocks for the blocks of the pictures of the first set of temporal layers. By contrast, the video coder may apply neural network based coding techniques to pictures of a second set of temporal layers having higher temporal layer values than the first set of temporal layers (e.g., where pictures of the second set of temporal layers may be predicted from the pictures of the first set of temporal layers).

In one example, a method of decoding video data includes: determining that a first temporal layer identifier of a first picture of video data is included in a first set of temporal layers; in response to the first temporal layer identifier being included in the first set of temporal layers, decoding blocks of the first picture on a block by block basis; determining that a second temporal layer identifier of a second picture of the video data is included in a second set of temporal layers, the second set of temporal layers being higher than the first set of temporal layers; and in response to the second temporal layer identifier being included in the second set of temporal layers, decoding the second picture using a neural network-based video decoder.

In another example, a device for decoding video data includes: a memory configured to store video data; and a processing system comprising one or more processors implemented in circuitry, the processing system being configured to: determine that a first temporal layer identifier of a first picture of the video data is included in a first set of temporal layers; in response to the first temporal layer identifier being included in the first set of temporal layers, decode blocks of the first picture on a block by block basis; determine that a second temporal layer identifier of a second picture of the video data is included in a second set of temporal layers, the second set of temporal layers being higher than the first set of temporal layers; and in response to the second temporal layer identifier being included in the second set of temporal layers, execute a neural network-based video decoder to decode the second picture.

In another example, a device for decoding video data includes: means for determining that a first temporal layer identifier of a first picture of video data is included in a first set of temporal layers; means for decoding blocks of the first picture on a block by block basis in response to the first temporal layer identifier being included in the first set of temporal layers; means for determining that a second temporal layer identifier of a second picture of the video data is included in a second set of temporal layers, the second set of temporal layers being higher than the first set of temporal layers; and means for decoding the second picture using a neural network-based video decoder in response to the second temporal layer identifier being included in the second set of temporal layers.

In another example, a computer-readable storage medium has stored thereon instructions that, when executed, cause a processor to: determine that a first temporal layer identifier of a first picture of video data is included in a first set of temporal layers; in response to the first temporal layer identifier being included in the first set of temporal layers, decode blocks of the first picture on a block by block basis; determine that a second temporal layer identifier of a second picture of the video data is included in a second set of temporal layers, the second set of temporal layers being higher than the first set of temporal layers; and in response to the second temporal layer identifier being included in the second set of temporal layers, execute a neural network-based video decoder to decode the second picture.

The details of one or more examples are set forth in the accompanying drawings and the description below. Other features, objects, and advantages will be apparent from the description, drawings, and claims.

DETAILED DESCRIPTION

Neural video codecs (NVCs), also referred to herein as "neural network-based video codecs," may replace one or more (and in some cases, all) traditional codec components with neural networks. NVCs have been shown to have a number of promising benefits over traditional approaches, such as ITU-T H.266/VVC (Versatile Video Coding). NVCs can be flexibly optimized with respect to any differentiable objective, e.g., perceptual quality or video coding for machines. NVCs can be overfitted to a particular domain (e.g., auto). NVCs are often implemented as software-based codecs and can form proprietary solutions.

In addition, research supporting the techniques of this disclosure has demonstrated an NVC can be capable of outperforming VVC in both low-delay (LD) configurations and much of random access (RA). For example, in LD:

TABLE 1

| Bjontegaard-Delta rate of LD NVC over VTM on JVET common test conditions | | | | |
| --- | --- | --- | --- | --- |
| Low delay P Main10 Over VTM-16.0 | | | | |
| Y | U | V | EncT | DecT |
| Class A1 | | | | |
| Class A2 | | | | |
| Class B | −12.15% | −6.10% | −22.83% | #NUM! | #NUM! |
| Class C | −24.93% | −36.19% | −44.98% | #NUM! | #NUM! |
| Class E | −6.85% | 15.63% | −11.28% | #NUM! | #NUM! |
| Overall | −15.09% | −10.70% | −27.33% | #NUM! | #NUM! |
| Class D | −32.47% | −43.36% | −54.11% | #NUM! | #NUM! |
| Class F | #VALUE! | #VALUE! | #VALUE! | #DIV/0! | #NUM! |

Whilst neural codecs continue to develop rapidly, VVC (and other codecs) retain many desirable properties, such as sophisticated motion prediction. Specifically, the ability to perform prediction when operating with motion vectors of a large absolute magnitude, which is achieved via rate-distortion optimization, remain beneficial. This advantage is especially prevalent in random access. Here, frames are coded bidirectionally in a hierarchical order.

Figure 1:
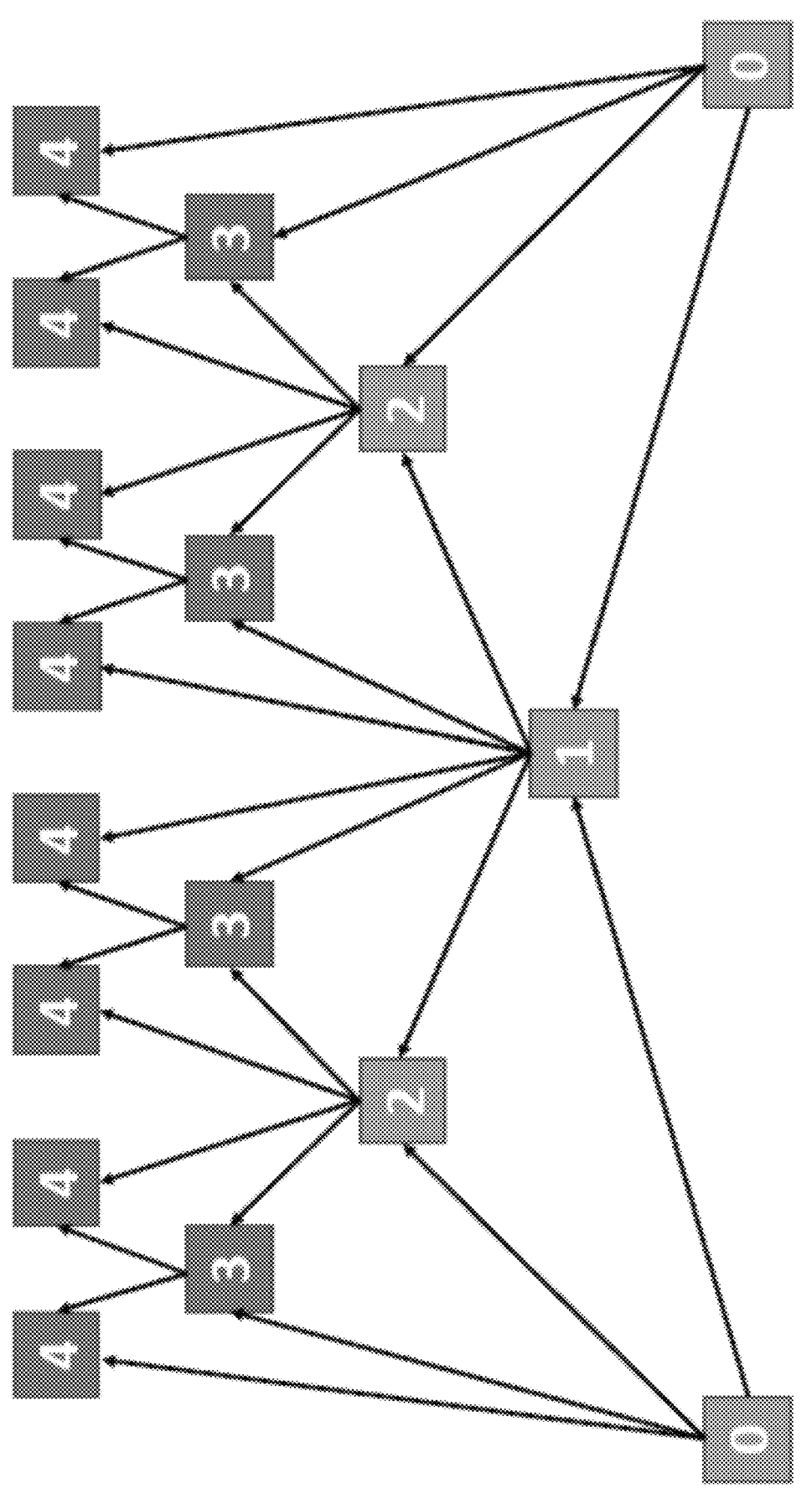
FIG. 1 is a conceptual diagram illustrating an example hierarchical coding order for a group of pictures (GOP).

FIG. 1 is a conceptual diagram illustrating an example hierarchical coding order for a group of pictures (GOP). In GOP of size 16 in FIG. 1, a motion-predicted frame at temporal layer 1 is predicted from frames at temporal layer 0, each 8 frames apart. (In practice, GOPs of 64 are often used, where the first temporal layer is predicted from reference frames 32 frames apart).

In 4k video sequences, the resultant motion vectors used for warping and prediction can have a Euclidean norm of over 500 pixels. In contrast to NVCs, traditional codecs have proven especially performant in capturing large motion. In contrast, NVCs have demonstrated themselves presently better at small motion. For example, the NVC discussed above outperforms VTM class D by over 30% (class D is WQVGA so the norm is always small).

As such, this disclosure describes techniques including combining two codecs, leveraging the best of both, thereby forming a composite. A VVC coder or other conventional coder may be used to code lower temporal layers of a hierarchical GOP, and an NVC may be used to code higher temporal layers (e.g., most of the GOP structure). For example, the lower temporal layers may correspond to layers 0, 1, and 2 (lightly shaded in FIG. 1), and the NVC may be used to code higher layers, e.g., darker shaded layers 3 and 4 in FIG. 1. In this sense, a conventional coder such as VVC may "anchor" that partition of the GOP into smaller sub-structures. The resulting combined codec may be highly performant and achieve state of the art video coding performance.

In particular, per the techniques of this disclosure, block-based video coding techniques (e.g., including prediction and residual coding) may be performed to code blocks of pictures of a first set of temporal layers (e.g., layers 0, 1, and 2). Furthermore, pictures of a second set of temporal layers (e.g., layers 3 and 4) may be coded using neural network coding techniques. Pictures of layers 0, 1, and 2 may be provided to the neural network video coder when performing neural network coding of pictures of layers 3 and 4, such that the pictures of layers 0, 1, and 2 may be used for reference by the neural network video coder.

Typically, when video data is divided into temporal layers, e.g., N layers, a device may select a layer (e.g., layer J where J<=N) at which to retrieve pictures of video data. The device may then retrieve all pictures at layers 0 to J without losing the ability to properly decode any of the retrieved pictures. For example, in FIG. 1, a device may elect to retrieve pictures up to layer 3, in which case the device would retrieve pictures at layers 0-3 and omit pictures of layer 4. Because pictures of layer 3 may be predicted from pictures of layers 0-2, omission of pictures of layer 4 will not preclude the retrieved pictures of layers 0-3 from being properly decoded.

Additionally, in FIG. 1, the pictures are shown in display order from left to right. However, the encoding and decoding order of pictures is not necessarily the same as the display order for the pictures. For example, the pictures of layer 0 may correspond to the ordinal first and last pictures to be displayed in the example of FIG. 1. The picture of layer 1 may have a display order in the middle of all depicted pictures. However, the picture of layer 1 would need to be coded after the pictures of layer 0 have been coded, in order to use either or both of the pictures of layer 0 as reference pictures during coding. Likewise, the pictures of layer 2 would be coded after the picture of layer 1, and so on. Thus, a video decoder may rearrange an output order for decoded pictures according to the display order (also referred to as the "picture order count" or "POC" values for pictures of video data). By contrast, the coding order of pictures may correspond to "frame number" values for the pictures.

Figure 2:
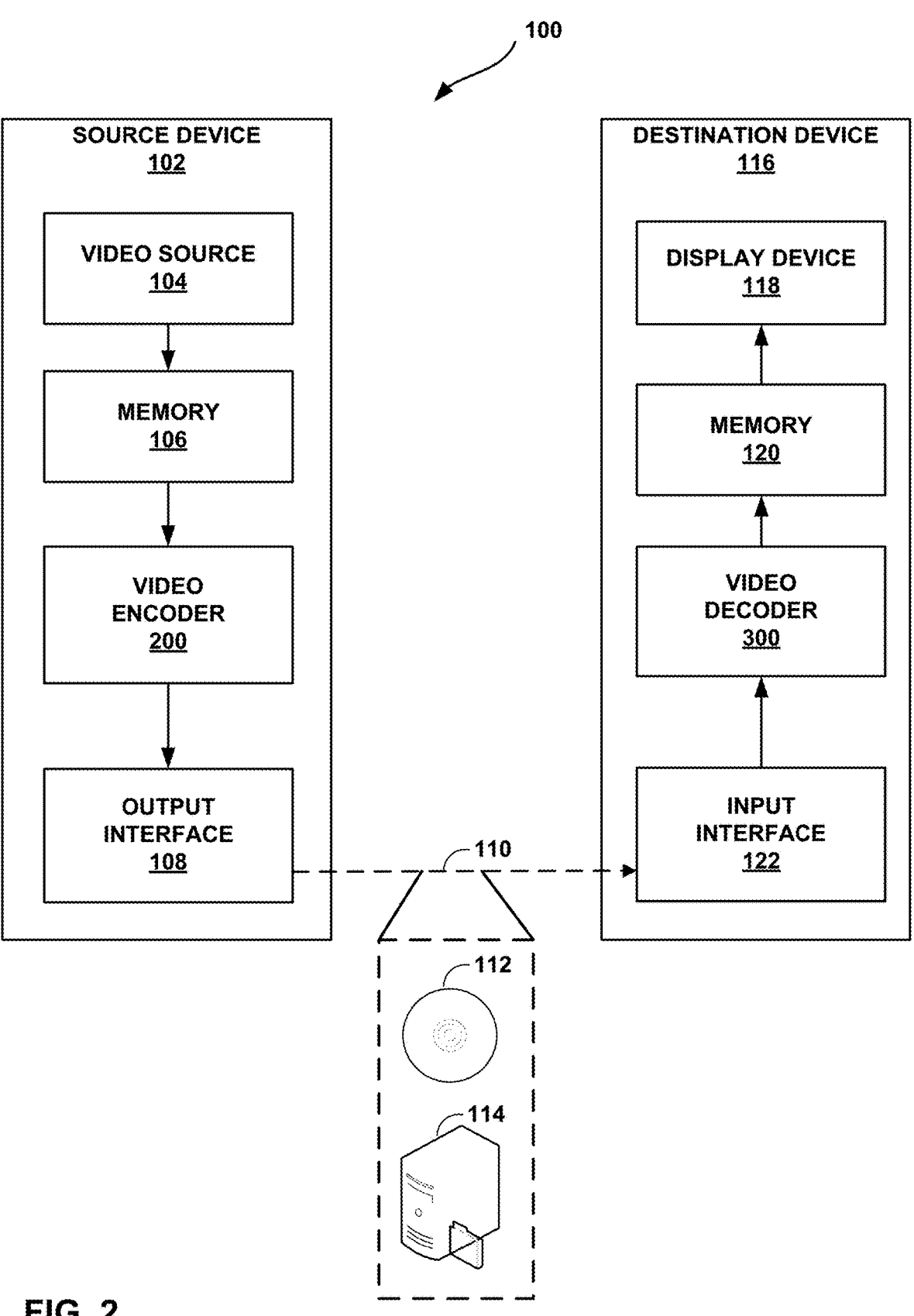
FIG. 2 is a block diagram illustrating an example video encoding and decoding system that may perform the techniques of this disclosure.

FIG. 2 is a block diagram illustrating an example video encoding and decoding system 100 that may perform certain techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 2, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 2, source device 102 includes video source 104, memory 106, video encoder 200, and output interface 108. Destination device 116 includes input interface 122, video decoder 300, memory 120, and display device 118. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 2 is merely one example. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 2, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may include block-based video coders that operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may include block-based video coders that operate according to other proprietary or industry standards, such as ITU-T H.266, also referred to as Versatile Video Coding (VVC). In other examples, video encoder 200 and video decoder 300 may include block-based video coders that operate according to a proprietary video codec/format, such as AOMedia Video 1 (AV1), extensions of AV1, and/or successor versions of AV1 (e.g., AV2). In other examples, video encoder 200 and video decoder 300 may include block-based video coders that operate according to other proprietary formats or industry standards. The techniques of this disclosure, however, are not limited to any particular coding standard or format.

Moreover, per the techniques of this disclosure, video encoder 200 and video decoder 300 may each include both a video coder that is configured to operate according to conventional coding techniques (e.g., a video coding standard such as VVC, AV1, HEVC, or the like), as well as a neural network based video coder. As discussed in greater detail below, video encoder 200 and video decoder 300 may be configured to code (encode or decode, respectively) pictures using either conventional video coder or the neural network-based video coder according to a temporal layer including the picture (that is, a temporal layer identifier for the picture).

Per the example of FIG. 1, video encoder 200 may be configured to encode pictures having temporal layer identifier values of 0, 1, or 2 using conventional encoding techniques (e.g., using a block-based video encoder), and to encode pictures having temporal layer identifier values of 3 or 4 using neural network-based video encoding techniques. Similarly, video decoder 300 may be configured to decode pictures having temporal layer identifier values of 0, 1, or 2 using conventional decoding techniques (e.g., using a block-based video decoder), and to decode pictures having temporal layer identifier values of 3 or 4 using neural network-based video decoding techniques.

This disclosure refers to "conventional" encoding and decoding techniques as those in which pictures are partitioned into blocks of fixed or variable size (e.g., macroblocks or coding units (CUs)), and then predictively encoded or decoded. That is, conventional coding techniques include those in which blocks of a picture are predicted using a prediction mode, such as inter-prediction, intra-prediction, affine prediction, intra block copy (IBC), or the like. Conventional coding techniques also including coding residual blocks for the blocks of the picture, where the residual blocks represent sample-by-sample differences between the original blocks and the prediction blocks.

In general, the conventional coders (i.e., block-based video coder) of video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, block-based video coders of video encoder 200 and video decoder 300 may code video data represented in a YUV (e.g., Y, Cb, Cr) format. That is, rather than coding red, green, and blue (RGB) data for samples of a picture, block-based video coders of video encoder 200 and video decoder 300 may code luminance and chrominance components, where the chrominance components may include both red hue and blue hue chrominance components. In some examples, a block-based video coder of video encoder 200 converts received RGB formatted data to a YUV representation prior to encoding, and a block-based video coder of video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as a block-based video coder of video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, block-based video coders of video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, block-based video coders of video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, block-based video coders of video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, block-based video coders of video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Block-based video coders of video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUS) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value.

The samples in a CU may be arranged in rows and columns. Moreover, CUs need not necessarily have the same number of samples in the horizontal direction as in the vertical direction. For example, CUs may comprise N×M samples, where M is not necessarily equal to N.

A block-based video coder of video encoder 200 may encode video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, a block-based video coder of video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, a block-based video coder of video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

A block-based video coder of video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, block-based video coders of video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, a block-based video coder of video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, a block-based video coder of video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, a block-based video coder of video encoder 200 may assign a context within a context model to a symbol to be transmitted. The context may relate to, for example, whether neighboring values of the symbol are zero-valued or not. The probability determination may be based on a context assigned to the symbol.

A block-based video coder of video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, a block-based video coder of video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, a block-based video coder of video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. A block-based video coder of video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

The various block-based coding techniques as discussed above may be performed by block-based video coding units of video encoder 200 and video decoder 300. Video encoder 200 and video decoder 300 may apply the block-based video coding units to blocks of pictures according to whether the pictures belong to a temporal layer for which block-based video coding is to be performed. Additionally, per the techniques of this disclosure, for pictures of other temporal layers, video encoder 200 and video decoder 300 may apply neural network-based video coding techniques to code the pictures. Neural network-based video coding generally includes training one or more neural network models to encode or decode pictures relative to previously coded and reconstructed pictures.

Figure 3:
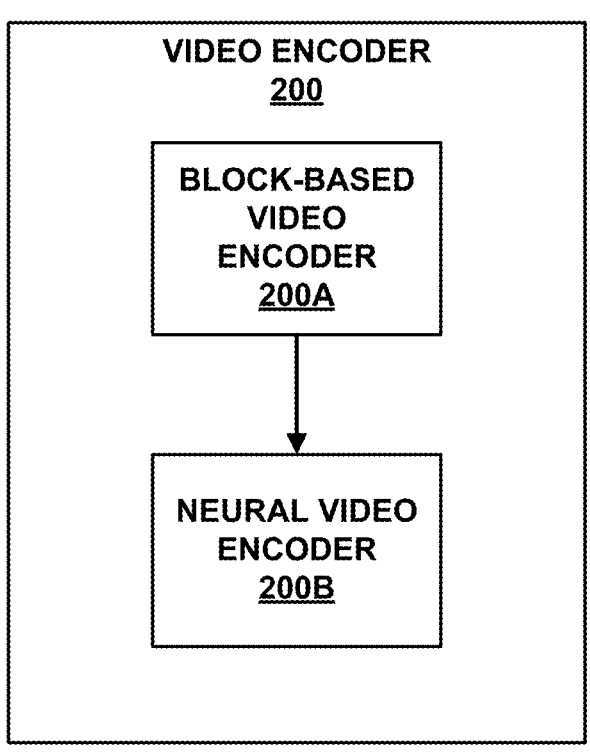
FIG. 3 is a block diagram illustrating an example combined video encoder that may perform techniques of this disclosure.
Figure 4:
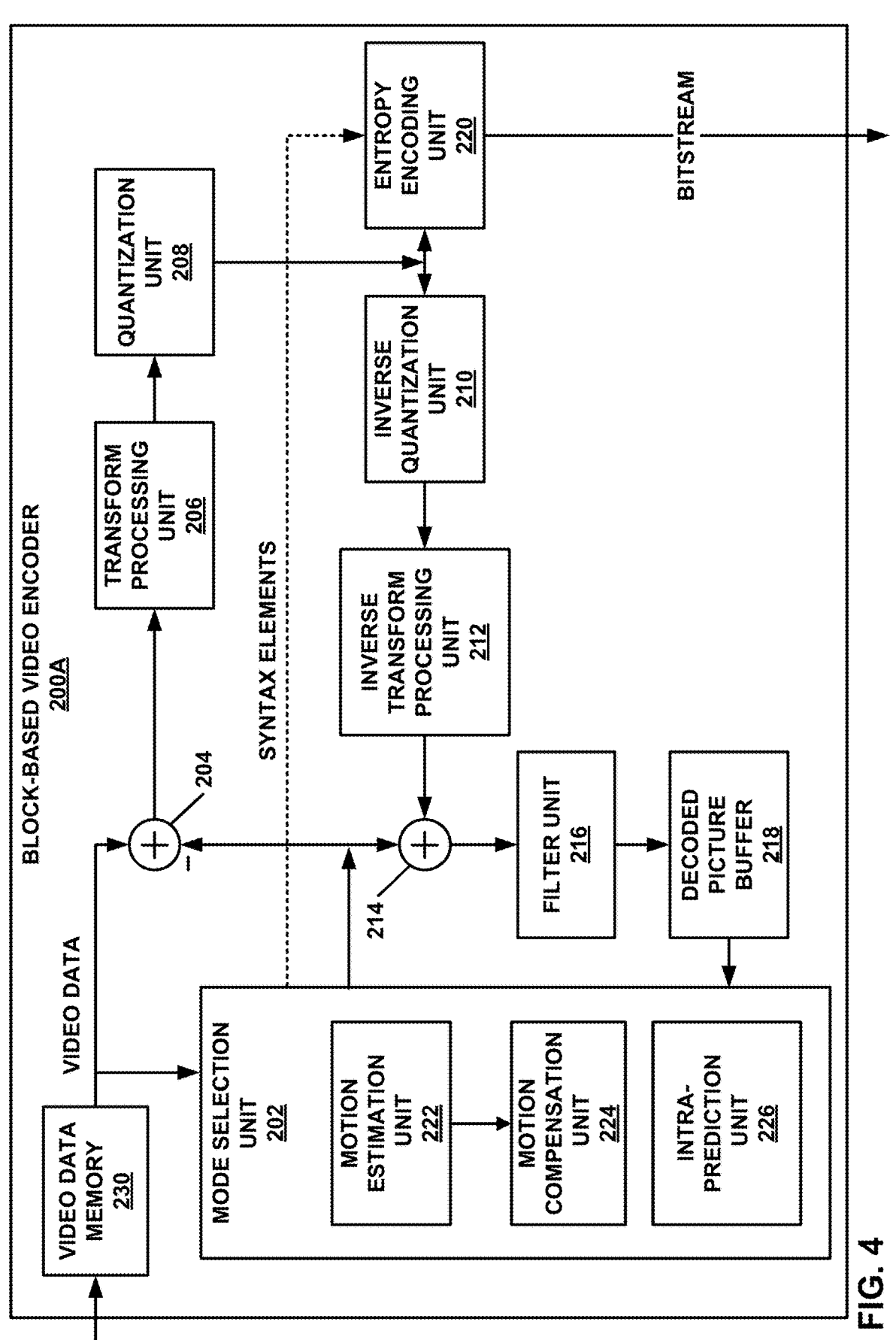
FIG. 4 is a block diagram illustrating an example video encoder that may perform certain techniques of this disclosure.

FIG. 3 is a conceptual diagram illustrating an example combined video encoder 200 that may perform techniques of this disclosure. In this example, video encoder 200 includes block-based video encoder 200A and neural video encoder 200B. Block-based video encoder 200A may include conventional video coding components as shown in FIG. 4 below. Neural video encoder 200B may perform neural network encoding of video data. Video encoder 200 generally may be configured with temporal layer identifier values indicating which of block-based video encoder 200A or neural video encoder 200B should encode particular temporal layers of video data. For example, as shown in FIG. 1 above, block-based video encoder 200A may encode temporal layers 0, 1, and 2, and neural video encoder 200B may encode temporally layers 3 and 4.

Moreover, as discussed above, video encoder 200 may arrange the pictures from a display order (or capture/generation order) into coding order. The coding order may place pictures at lower temporal layers before pictures at higher temporal layers in the coded bitstream. In this manner, the pictures may be coded in coding order such that all needed reference pictures are decoded prior to use by subsequently decoded pictures as reference pictures.

FIG. 4 is a block diagram illustrating an example block-based video encoder 200A that may perform certain techniques of this disclosure. FIG. 4 is provided for purposes of explanation and should not be considered limiting of the techniques as broadly exemplified and described in this disclosure. For purposes of explanation, this disclosure describes block-based video encoder 200A according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 4, block-based video encoder 200A includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of block-based video encoder 200A may be implemented as one or more circuits or logic elements as part of hardware circuitry, or as part of a processor, ASIC, or FPGA. Moreover, block-based video encoder 200A may include additional or alternative processors or processing circuitry to perform these and other functions.

Video data memory 230 may store video data to be encoded by the components of block-based video encoder 200A. Block-based video encoder 200A may receive the video data stored in video data memory 230 from, for example, video source 104 (FIG. 2). DPB 218 may act as a reference picture memory that stores reference video data for use in prediction of subsequent video data by block-based video encoder 200A. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of block-based video encoder 200A, as illustrated, or off-chip relative to those components.

In this disclosure, reference to video data memory 230 should not be interpreted as being limited to memory internal to block-based video encoder 200A, unless specifically described as such, or memory external to block-based video encoder 200A, unless specifically described as such. Rather, reference to video data memory 230 should be understood as reference memory that stores video data that block-based video encoder 200A receives for encoding (e.g., video data for a current block that is to be encoded). Memory 106 of FIG. 2 may also provide temporary storage of outputs from the various units of block-based video encoder 200A.

The various units of FIG. 4 are illustrated to assist with understanding the operations performed by block-based video encoder 200A. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Block-based video encoder 200A may include arithmetic logic units (ALUs), elementary function units (EFUs), digital circuits, analog circuits, and/or programmable cores, formed from programmable circuits. In examples where the operations of block-based video encoder 200A are performed using software executed by the programmable circuits, memory 106 (FIG. 2) may store the instructions (e.g., object code) of the software that block-based video encoder 200A receives and executes, or another memory within block-based video encoder 200A (not shown) may store such instructions.

Video data memory 230 is configured to store received video data. Block-based video encoder 200A may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Block-based video encoder 200A may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, block-based video encoder 200A may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Block-based video encoder 200A and block-based video decoder 300A may support PUs having various sizes. As indicated above, the size of a CU may refer to the size of the luma coding block of the CU and the size of a PU may refer to the size of a luma prediction unit of the PU. Assuming that the size of a particular CU is 2N×2N, block-based video encoder 200A may support PU sizes of 2N×2N or N×N for intra prediction, and symmetric PU sizes of 2N×2N, 2N×N, N×2N, N×N, or similar for inter prediction. Block-based video encoder 200A and block-based video decoder 300A may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. Block-based video encoder 200A and block-based video decoder 300A may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Block-based video encoder 200A (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Block-based video encoder 200A stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of block-based video encoder 200A. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Block-based video encoder 200A may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 5:
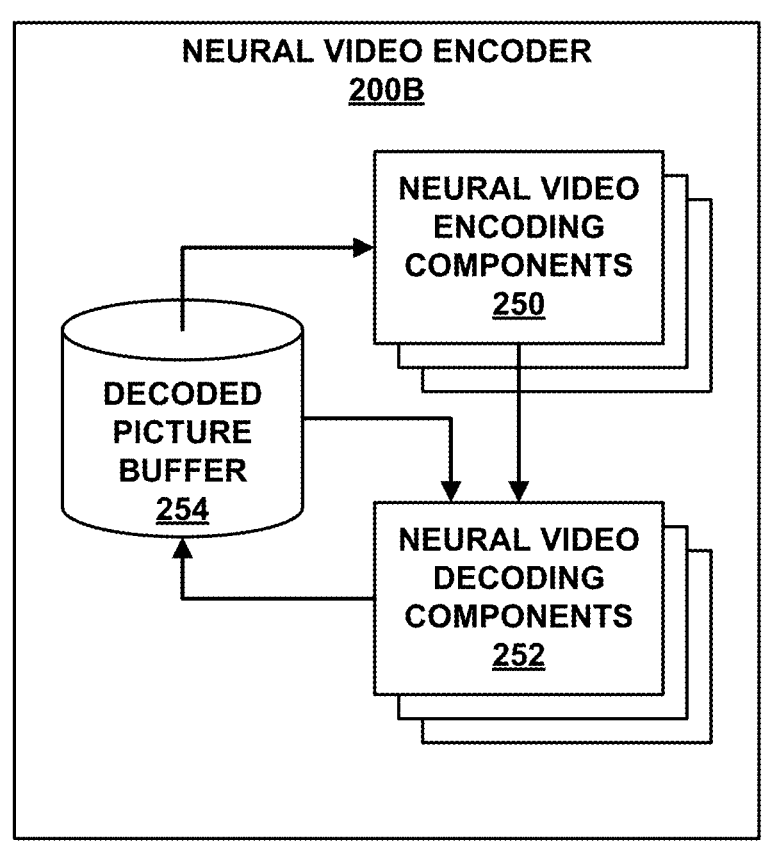
FIG. 5 is a block diagram illustrating an example set of components of a neural network-based video encoder.

FIG. 5 is a block diagram illustrating an example set of components of neural video encoder 200B. In this example, neural video encoder 200B includes neural video encoding components 250, neural video decoding components 252, and decoded picture buffer (DPB) 254. Neural video encoding components 250 may include a variety of different neural network components, such as convolutional neural networks (CNNs), parametric rectified linear units (PRELUs), or the like. In some cases, neural video encoding components 250 may be arranged similarly to the components of block-based video encoder 200A, such that there is a component or set of components for each of prediction, transformation, quantization, entropy encoding, and the like. In other examples, neural video encoding components 250 need not necessarily match the arrangement of block-based video encoder 200A, but may instead be arranged in other manners.

Neural video encoding components 250 may output encoded video data, which video encoder 200 of FIG. 3 may assemble into a bitstream along with encoded video data from block-based video encoder 200A. Neural video encoding components 250 may also provide encoded video data to neural video decoding components 252, which may decode the encoded video data and store the decoded video data to decoded picture buffer 254. In this manner, neural video encoding components 250 may use the decoded video data for reference when encoding future video data.

Figure 6:
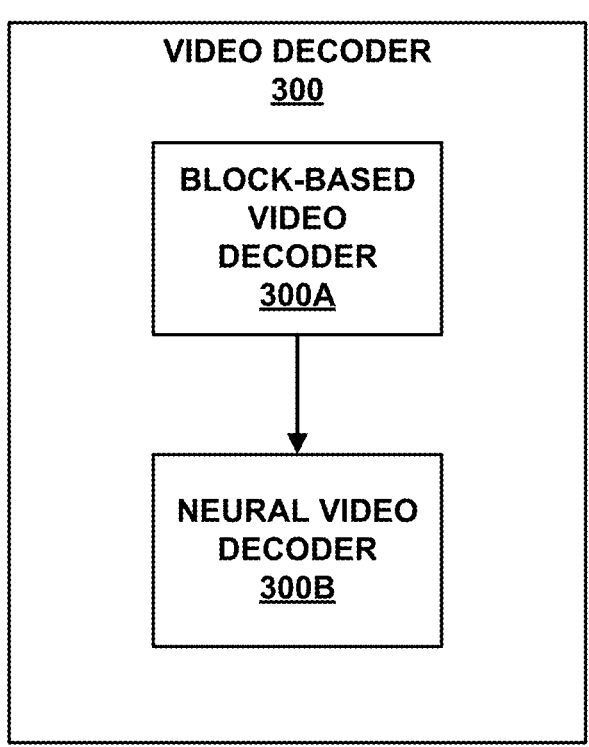
FIG. 6 is a block diagram illustrating an example combined video decoder that may perform techniques of this disclosure.
Figure 7:
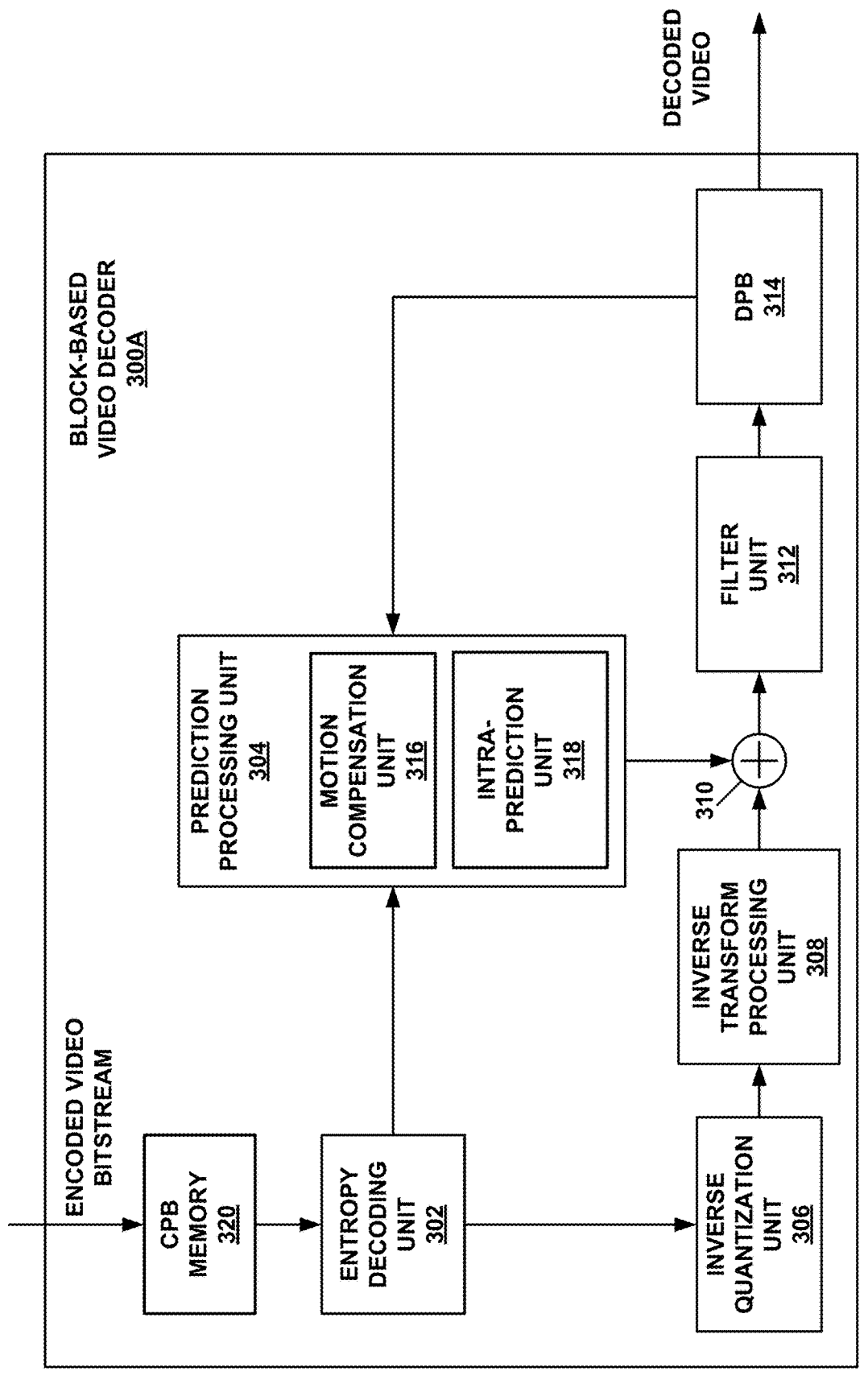
FIG. 7 is a block diagram illustrating an example video decoder that may perform certain techniques of this disclosure.

FIG. 6 is a block diagram illustrating an example combined video decoder that may perform techniques of this disclosure. In this example, video decoder 300 includes block-based video decoder 300A and neural video decoder 300B. Block-based video decoder 300A may include conventional video coding components as shown in FIG. 7 below. Neural video decoder 300B may perform neural network decoding of video data. Video decoder 300 generally may be configured with temporal layer identifier values indicating which of block-based video decoder 300A or neural video decoder 300B should decode particular temporal layers of video data. For example, as shown in FIG. 1 above, block-based video decoder 300A may decode temporal layers 0, 1, and 2, and neural video decoder 300B may decode temporally layers 3 and 4.

Additionally, following decoding of the pictures, video decoder 300 may rearrange the decoded pictures from decoding order into display order. In this manner, following decoding, the pictures may be placed in proper viewing order for output and display. In particular, video decoder 300 may arrange the pictures such that a picture of a lower temporal layer that was coded using block-based video decoding techniques is placed after a later-coded picture of a higher temporal layer that was coded using neural network-based video coding techniques.

FIG. 7 is a block diagram illustrating an example block-based video decoder 300A that may perform the techniques of this disclosure. FIG. 7 is provided for purposes of explanation and is not limiting on the techniques as broadly exemplified and described in this disclosure. For purposes of explanation, this disclosure describes block-based video decoder 300A according to the techniques of VVC (ITU-T H.266, under development) and HEVC (ITU-T H.265). However, the techniques of this disclosure may be performed by video coding devices that are configured to other video coding standards.

In the example of FIG. 7, block-based video decoder 300A includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of block-based video decoder 300A may be implemented as one or more circuits or logic elements as part of hardware circuitry, or as part of a processor, ASIC, or FPGA. Moreover, block-based video decoder 300A may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, block-based video decoder 300A may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of block-based video decoder 300A. The video data stored in CPB memory 320 may be obtained, for example, from computer-readable medium 110 (FIG. 2). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of block-based video decoder 300A. DPB 314 generally stores decoded pictures, which block-based video decoder 300A may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of block-based video decoder 300A, or off-chip relative to those components.

Additionally or alternatively, in some examples, block-based video decoder 300A may retrieve coded video data from memory 120 (FIG. 2). That is, memory 120 may store data as discussed above with CPB memory 320. Likewise, memory 120 may store instructions to be executed by block-based video decoder 300A, when some or all of the functionality of block-based video decoder 300A is implemented in software to be executed by processing circuitry of block-based video decoder 300A.

The various units shown in FIG. 7 are illustrated to assist with understanding the operations performed by block-based video decoder 300A. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Block-based video decoder 300A may include ALUs, EFUs, digital circuits, analog circuits, and/or programmable cores formed from programmable circuits. In examples where the operations of block-based video decoder 300A are performed by software executing on the programmable circuits, on-chip or off-chip memory may store instructions (e.g., object code) of the software that block-based video decoder 300A receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, block-based video decoder 300A reconstructs a picture on a block-by-block basis. Block-based video decoder 300A may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Block-based video decoder 300A may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, block-based video decoder 300A may output decoded pictures (e.g., decoded video) from DPB 314 for subsequent presentation on a display device, such as display device 118 of FIG. 2.

Figure 8:
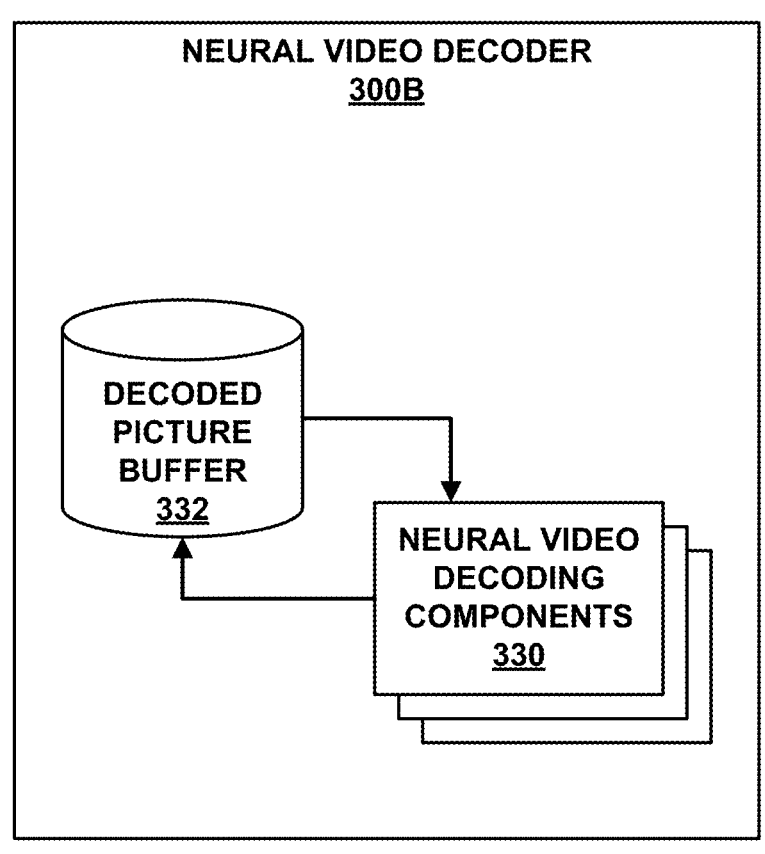
FIG. 8 is a block diagram illustrating an example set of components of a neural network-based video decoder.

FIG. 8 is a block diagram illustrating an example set of components of neural video decoder 300B. In this example, neural video decoder 300B includes neural video decoding components 330 and decoded picture buffer (DPB) 332. Neural video decoding components 330 may include a variety of different neural network components, such as convolutional neural networks (CNNs), parametric rectified linear units (PRELUs), or the like. In general, neural video decoding components 330 (and neural video decoder components 252) may use neural network models corresponding to the models used to encode video data by neural video encoding components 250 of FIG. 5. In some cases, neural video decoding components 330 may be arranged similarly to the components of block-based video decoder 300A, such that there is a component or set of components for each of entropy decoding, prediction, inverse transformation, inverse quantization, and the like. In other examples, neural video decoding components 330 need not necessarily match the arrangement of block-based video decoder 300A, but may instead be arranged in other manners. Neural video decoding components 330 may both output decoded video data and store the decoded video data to DPB 332 for reference when decoding subsequent video data.

Figure 9:
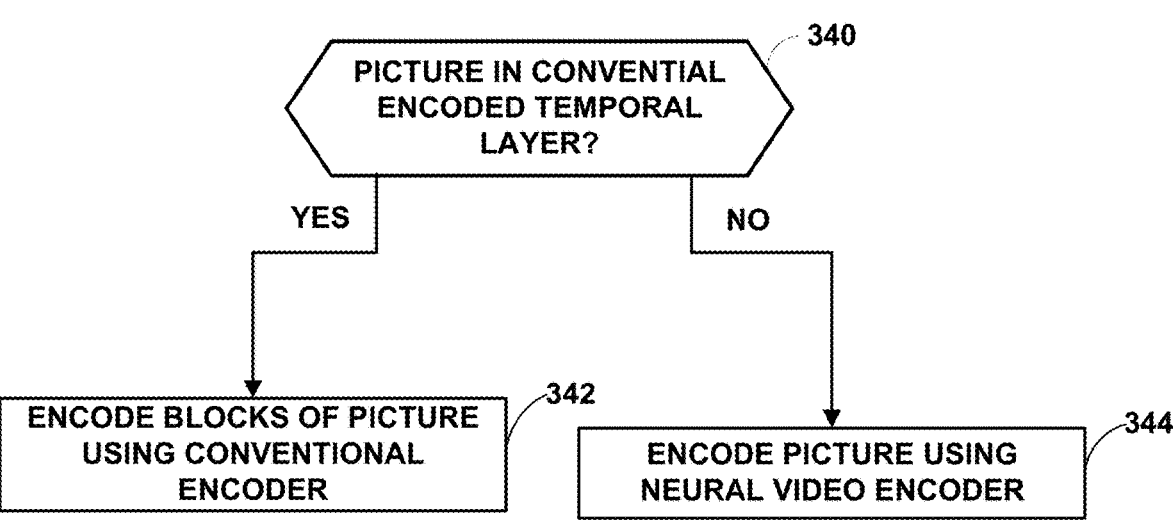
FIG. 9 is a flowchart illustrating an example method for determining whether to encode a picture using a conventional encoder or a neural network-based video encoder per the techniques of this disclosure.

FIG. 9 is a flowchart illustrating an example method for determining whether to encode a picture using a conventional encoder, such as block-based video encoder 200A, or a neural video encoder, such as neural video encoder 200B, per the techniques of this disclosure.

Initially, video encoder 200 may determine whether a current picture is in a set of conventional encoded temporal layers (340). That is, video encoder 200 may determine whether a temporal layer for the picture is included in a set of temporal layers that is to be encoded using a conventional encoder, such as block-based video encoder 200A. If the current picture is in the set of conventional encoded temporal layers ("YES" branch of 340), video encoder 200 may encode blocks of the picture using conventional encoding techniques performed by block-based video encoder 200A (342). For example, block-based video encoder 200A may perform the method of FIG. 10 for each block, which may include both prediction and residual coding. However, if the current picture is not in the set of conventional encoded temporal layers ("NO" branch of 340), video encoder 200 may encode the picture using neural video encoder 200B (344).

Figure 10:
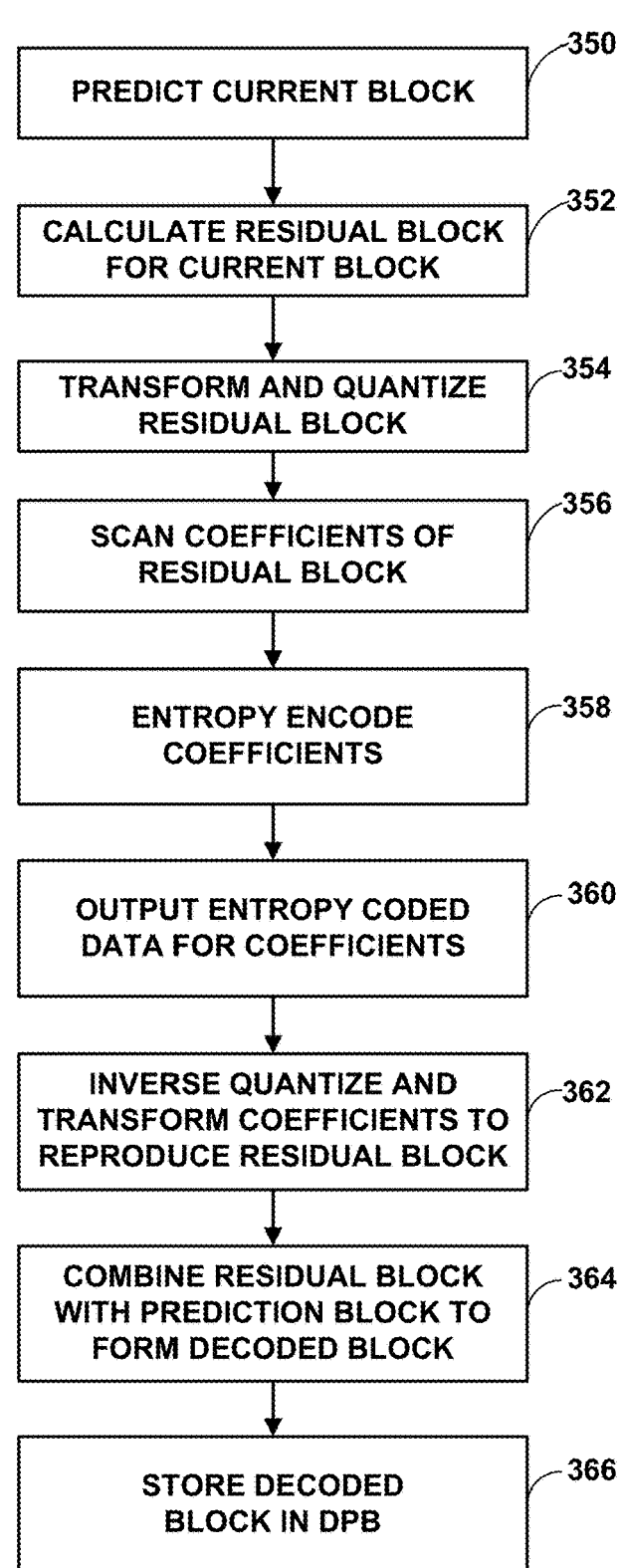
FIG. 10 is a flowchart illustrating an example method for encoding a current block in accordance with the techniques of this disclosure.

FIG. 10 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 10. The current block may belong to a picture having a temporal layer identifier for which conventional video encoding techniques are to be performed.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder

200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 11:
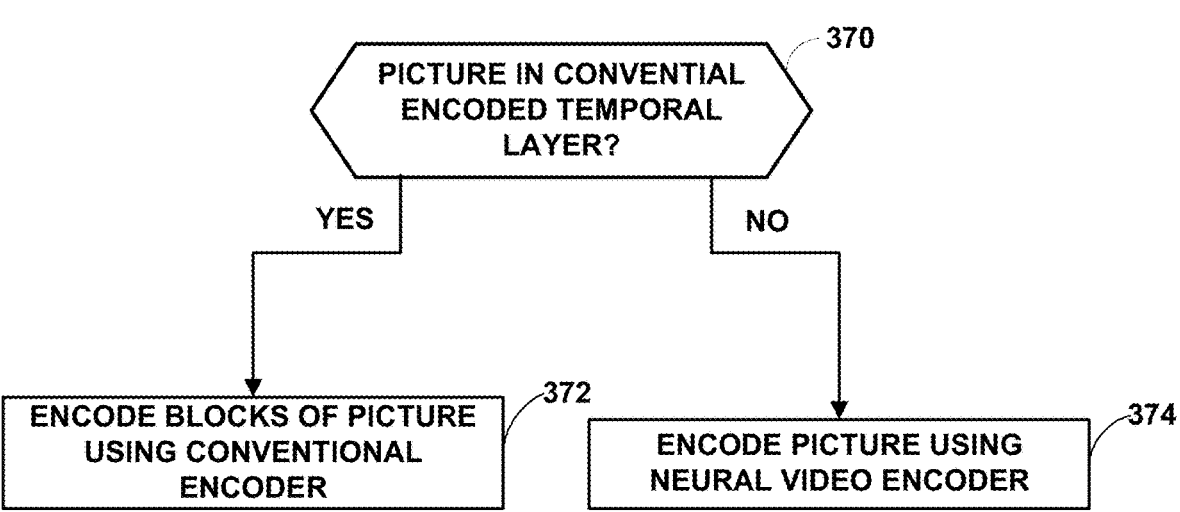
FIG. 11 is a flowchart illustrating an example method for determining whether to decode a picture using a conventional decoder or a neural network-based video decoder per the techniques of this disclosure.

FIG. 11 is a flowchart illustrating an example method for determining whether to encode a picture using a conventional decoder, such as block-based video decoder 300A, or a neural video decoder, such as neural video decoder 300B, per the techniques of this disclosure.

Initially, video decoder 300 may determine whether a current picture is in a set of conventional encoded temporal layers (370). That is, video decoder 300 may determine whether a temporal layer for the picture is included in a set of temporal layers that is to be decoded using a conventional decoder, such as block-based video decoder 300A. If the current picture is in the set of conventional encoded temporal layers ("YES" branch of 370), video decoder 300 may decode blocks of the picture using conventional encoding techniques performed by block-based video decoder 300A (372). For example, video decoder 300 may perform the method of FIG. 12 for each block, which may include prediction and residual coding. However, if the current picture is not in the set of conventional encoded temporal layers ("NO" branch of 370), video decoder 300 may decode the picture using neural video decoder 300B (374).

Figure 12:
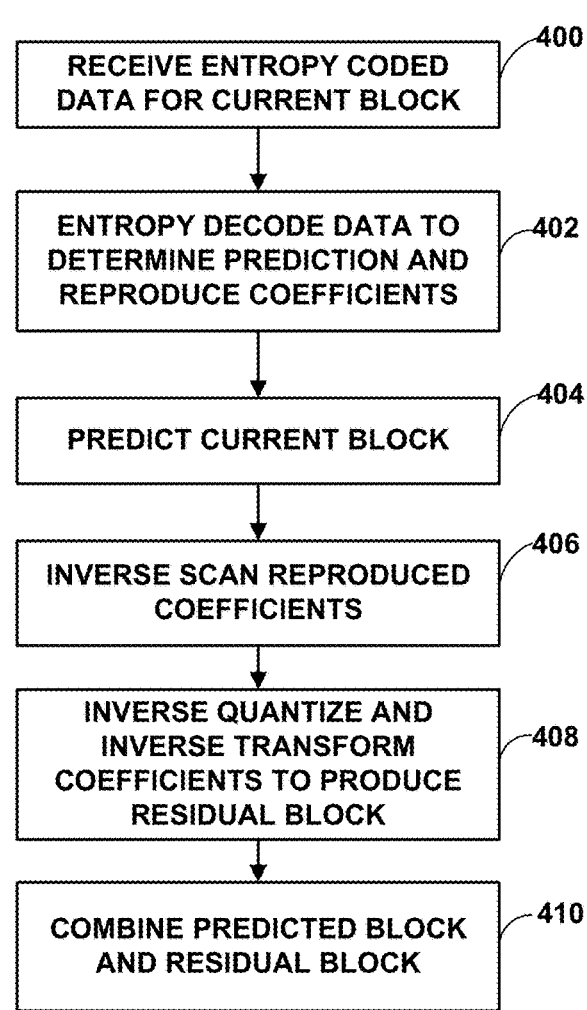
FIG. 12 is a flowchart illustrating an example method for decoding a current block in accordance with the techniques of this disclosure.

FIG. 12 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 12.

Video decoder 300 may receive entropy encoded data for the current block, such as entropy encoded prediction information and entropy encoded data for transform coefficients of a residual block corresponding to the current block (400). Video decoder 300 may entropy decode the entropy encoded data to determine prediction information for the current block and to reproduce transform coefficients of the residual block (402). Video decoder 300 may predict the current block (404), e.g., using an intra- or inter-prediction mode as indicated by the prediction information for the current block, to calculate a prediction block for the current block. Video decoder 300 may then inverse scan the reproduced transform coefficients (406), to create a block of quantized transform coefficients. Video decoder 300 may then inverse quantize the transform coefficients and apply an inverse transform to the transform coefficients to produce a residual block (408). Video decoder 300 may ultimately decode the current block by combining the prediction block and the residual block (410).

Various examples of the techniques of this disclosure are summarized in the following clauses:

Clause 1: A method of decoding video data, the method comprising: determining that a first temporal layer identifier of a first picture of video data is included in a first set of temporal layers; in response to the first temporal layer identifier being included in the first set of temporal layers, decoding blocks of the first picture on a block by block basis; determining that a second temporal layer identifier of a second picture of the video data is included in a second set of temporal layers, the second set of temporal layers being higher than the first set of temporal layers; and in response to the second temporal layer identifier being included in the second set of temporal layers, decoding the second picture using a neural network-based video decoder.

Clause 2: The method of clause 1, further comprising: encoding the blocks of the first picture on a block by block basis; and encoding the second picture using a neural network-based video encoder.

Clause 3: The method of clause 2, wherein encoding the blocks of the first picture includes: for a current block of the first picture, forming a prediction block using inter-prediction, intra-prediction, affine prediction, or intra block copy (IBC) mode; forming a residual block representing differences between the current block and the prediction block; and encoding the residual block and prediction information used to form the prediction block.

Clause 4: The method of clause 1, wherein decoding the blocks of the first picture includes: for a current block of the blocks of the first picture, forming a prediction block using one of inter-prediction, intra-prediction, affine prediction, or intra block copy (IBC) mode; decoding a residual block for the current block; and combining the prediction block with the residual block to form a decoded block for the current block.

Clause 5: The method of clause 1, wherein at least one picture of the second set of temporal layers is predicted from a reference picture of the first set of temporal layers.

Clause 6: The method of clause 1, further comprising providing each of the pictures of the first set of temporal layers to the neural network-based video decoder as input for use when decoding pictures in the second set of temporal layers.

Clause 7: The method of clause 1, wherein decoding the blocks of the first picture and decoding the second picture comprises decoding the first picture before decoding the second picture, the method further comprising: determining that the second picture has a display order before a display order of the first picture; and outputting the second picture before outputting the first picture based on the second picture having the display order before the display order of the first picture.

Clause 8: A device for decoding video data, the device comprising: a memory configured to store video data; and a processing system comprising one or more processors implemented in circuitry, the processing system being configured to: determine that a first temporal layer identifier of a first picture of the video data is included in a first set of temporal layers; in response to the first temporal layer identifier being included in the first set of temporal layers, decode blocks of the first picture on a block by block basis; determine that a second temporal layer identifier of a second picture of the video data is included in a second set of temporal layers, the second set of temporal layers being higher than the first set of temporal layers; and in response to the second temporal layer identifier being included in the second set of temporal layers, execute a neural network-based video decoder to decode the second picture.

Clause 9: The device of clause 8, wherein the processing system is further configured to: encode the blocks of the first picture on a block by block basis; and execute a neural network-based video encoder to encode the second picture.

Clause 10: The device of clause 9, wherein to encode the blocks of the first picture, the processing system is configured to: for a current block of the first picture, form a prediction block using inter-prediction, intra-prediction, affine prediction, or intra block copy (IBC) mode; form a residual block representing differences between the current block and the prediction block; and encode the residual block and prediction information used to form the prediction block.

Clause 11: The device of clause 8, wherein to decode the blocks of the first picture, the processing system is configured to: for a current block of the blocks of the first picture, form a prediction block using one of inter-prediction, intra-prediction, affine prediction, or intra block copy (IBC) mode; decode a residual block for the current block; and combine the prediction block with the residual block to form a decoded block for the current block.

Clause 12: The device of clause 8, wherein at least one picture of the second set of temporal layers is predicted from a reference picture of the first set of temporal layers.

Clause 13: The device of clause 8, wherein the processing system is configured to provide each of the pictures of the first set of temporal layers to the neural network-based video decoder as input for use when decoding pictures in the second set of temporal layers.

Clause 14: The device of clause 8, wherein to decode the blocks of the first picture and to decode the second picture, the processing system is configured to decode the first picture before executing the neural network-based video decoder to decode the second picture, and wherein the processing system is further configured to: determine that the second picture has a display order before a display order of the first picture; and output the second picture before outputting the first picture based on the second picture having the display order before the display order of the first picture.

Clause 15: A device for decoding video data, the device comprising: means for determining that a first temporal layer identifier of a first picture of video data is included in a first set of temporal layers; means for decoding blocks of the first picture on a block by block basis in response to the first temporal layer identifier being included in the first set of temporal layers; means for determining that a second temporal layer identifier of a second picture of the video data is included in a second set of temporal layers, the second set of temporal layers being higher than the first set of temporal layers; and means for decoding the second picture using a neural network-based video decoder in response to the second temporal layer identifier being included in the second set of temporal layers.

Clause 16: The device of clause 15, further comprising: means for encoding the blocks of the first picture on a block by block basis; and means for encoding the second picture using a neural network-based video encoder.

Clause 17: The device of clause 16, wherein the means for encoding the blocks of the first picture includes: means for forming a prediction block using inter-prediction, intra-prediction, affine prediction, or intra block copy (IBC) mode for a current block of the first picture; means for forming a residual block representing differences between the current block and the prediction block; and means for encoding the residual block and prediction information used to form the prediction block.

Clause 18: The device of clause 15, wherein the means for decoding the blocks of the first picture includes: means for forming a prediction block using one of inter-prediction, intra-prediction, affine prediction, or intra block copy (IBC) mode for a current block of the blocks of the first picture; means for decoding a residual block for the current block;

and means for combining the prediction block with the residual block to form a decoded block for the current block.

Clause 19: The device of clause 15, further comprising means for providing each of the pictures of the first set of temporal layers to the neural network-based video decoder as input for use when decoding pictures in the second set of temporal layers.

Clause 20: The device of clause 15, wherein the means for decoding the blocks of the first picture is configured to decode the blocks of the first picture before the means for decoding the second picture decodes the second picture, further comprising: means for determining that the second picture has a display order before a display order of the first picture; and means for outputting the second picture before outputting the first picture based on the second picture having the display order before the display order of the first picture.

Clause 21: A method of decoding video data, the method comprising: determining that a first temporal layer identifier of a first picture of video data is included in a first set of temporal layers; in response to the first temporal layer identifier being included in the first set of temporal layers, decoding blocks of the first picture on a block by block basis; determining that a second temporal layer identifier of a second picture of the video data is included in a second set of temporal layers, the second set of temporal layers being higher than the first set of temporal layers; and in response to the second temporal layer identifier being included in the second set of temporal layers, decoding the second picture using a neural network-based video decoder.

Clause 22: The method of clause 21, further comprising: encoding the blocks of the first picture on a block by block basis; and encoding the second picture using a neural network-based video encoder.

Clause 23: The method of clause 22, wherein encoding the blocks of the first picture includes: for a current block of the first picture, forming a prediction block using inter-prediction, intra-prediction, affine prediction, or intra block copy (IBC) mode; forming a residual block representing differences between the current block and the prediction block; and encoding the residual block and prediction information used to form the prediction block.

Clause 24: The method of any of clauses 21-23, wherein decoding the blocks of the first picture includes: for a current block of the blocks of the first picture, forming a prediction block using one of inter-prediction, intra-prediction, affine prediction, or intra block copy (IBC) mode; decoding a residual block for the current block; and combining the prediction block with the residual block to form a decoded block for the current block.

Clause 25: The method of any of clauses 21-24, wherein at least one picture of the second set of temporal layers is predicted from a reference picture of the first set of temporal layers.

Clause 26: The method of any of clauses 21-25, further comprising providing each of the pictures of the first set of temporal layers to the neural network-based video decoder as input for use when decoding pictures in the second set of temporal layers.

Clause 27: The method of any of clauses 21-26, wherein decoding the blocks of the first picture and decoding the second picture comprises decoding the first picture before decoding the second picture, the method further comprising: determining that the second picture has a display order before a display order of the first picture; and outputting the second picture before outputting the first picture based on the second picture having the display order before the display order of the first picture.

Clause 28: A device for decoding video data, the device comprising: a memory configured to store video data; and a processing system comprising one or more processors implemented in circuitry, the processing system being configured to: determine that a first temporal layer identifier of a first picture of the video data is included in a first set of temporal layers; in response to the first temporal layer identifier being included in the first set of temporal layers, decode blocks of the first picture on a block by block basis; determine that a second temporal layer identifier of a second picture of the video data is included in a second set of temporal layers, the second set of temporal layers being higher than the first set of temporal layers; and in response to the second temporal layer identifier being included in the second set of temporal layers, execute a neural network-based video decoder to decode the second picture.

Clause 29: The device of clause 8, wherein the processing system is further configured to: encode the blocks of the first picture on a block by block basis; and execute a neural network-based video encoder to encode the second picture.

Clause 30: The device of clause 9, wherein to encode the blocks of the first picture, the processing system is configured to: for a current block of the first picture, form a prediction block using inter-prediction, intra-prediction, affine prediction, or intra block copy (IBC) mode; form a residual block representing differences between the current block and the prediction block; and encode the residual block and prediction information used to form the prediction block.

Clause 31: The device of any of clauses 28-30, wherein to decode the blocks of the first picture, the processing system is configured to: for a current block of the blocks of the first picture, form a prediction block using one of inter-prediction, intra-prediction, affine prediction, or intra block copy (IBC) mode; decode a residual block for the current block; and combine the prediction block with the residual block to form a decoded block for the current block.

Clause 32: The device of any of clauses 28-31, wherein at least one picture of the second set of temporal layers is predicted from a reference picture of the first set of temporal layers.

Clause 33: The device of any of clauses 28-32, wherein the processing system is configured to provide each of the pictures of the first set of temporal layers to the neural network-based video decoder as input for use when decoding pictures in the second set of temporal layers.

Clause 34: The device of any of clauses 28-33, wherein to decode the blocks of the first picture and to decode the second picture, the processing system is configured to decode the first picture before executing the neural network-based video decoder to decode the second picture, and wherein the processing system is further configured to: determine that the second picture has a display order before a display order of the first picture; and output the second picture before outputting the first picture based on the second picture having the display order before the display order of the first picture.

Clause 35: A device for decoding video data, the device comprising: means for determining that a first temporal layer identifier of a first picture of video data is included in a first set of temporal layers; means for decoding blocks of the first picture on a block by block basis in response to the first temporal layer identifier being included in the first set of temporal layers; means for determining that a second temporal layer identifier of a second picture of the video data is included in a second set of temporal layers, the second set of temporal layers being higher than the first set of temporal layers; and means for decoding the second picture using a neural network-based video decoder in response to the second temporal layer identifier being included in the second set of temporal layers.

Clause 36: The device of clause 35, further comprising: means for encoding the blocks of the first picture on a block by block basis; and means for encoding the second picture using a neural network-based video encoder.

Clause 37: The device of clause 36, wherein the means for encoding the blocks of the first picture includes: means for forming a prediction block using inter-prediction, intra-prediction, affine prediction, or intra block copy (IBC) mode for a current block of the first picture; means for forming a residual block representing differences between the current block and the prediction block; and means for encoding the residual block and prediction information used to form the prediction block.

Clause 38: The device of any of clauses 35-37, wherein the means for decoding the blocks of the first picture includes: means for forming a prediction block using one of inter-prediction, intra-prediction, affine prediction, or intra block copy (IBC) mode for a current block of the blocks of the first picture; means for decoding a residual block for the current block; and means for combining the prediction block with the residual block to form a decoded block for the current block.

Clause 39: The device of any of clauses 35-38, further comprising means for providing each of the pictures of the first set of temporal layers to the neural network-based video decoder as input for use when decoding pictures in the second set of temporal layers.

Clause 40: The device of any of clauses 35-39, wherein the means for decoding the blocks of the first picture is configured to decode the blocks of the first picture before the means for decoding the second picture decodes the second picture, further comprising: means for determining that the second picture has a display order before a display order of the first picture; and means for outputting the second picture before outputting the first picture based on the second picture having the display order before the display order of the first picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a first temporal layer identifier of a first picture of video data is included in a first set of temporal layers;
    in response to the first temporal layer identifier being included in the first set of temporal layers, decoding blocks of the first picture on a block by block basis, without performing neural network-based decoding of the first picture;

determining that a second temporal layer identifier of a second picture of the video data is included in a second set of temporal layers, the second set of temporal layers being higher than the first set of temporal layers; and in response to the second temporal layer identifier being included in the second set of temporal layers, decoding the second picture using a neural network-based video decoder, without performing block-based prediction and residual decoding of the second picture.

2. The method of claim 1, further comprising:

encoding the blocks of the first picture on a block by block basis; and encoding the second picture using a neural network-based video encoder.

3. The method of claim 2, wherein encoding the blocks of the first picture includes:

for a current block of the first picture, forming a prediction block using inter-prediction, intra-prediction, affine prediction, or intra block copy (IBC) mode;

forming a residual block representing differences between the current block and the prediction block; and encoding the residual block and prediction information used to form the prediction block.

4. The method of claim 1, wherein decoding the blocks of the first picture includes:

for a current block of the blocks of the first picture, forming a prediction block using one of inter-prediction, intra-prediction, affine prediction, or intra block copy (IBC) mode;

decoding a residual block for the current block; and combining the prediction block with the residual block to form a decoded block for the current block.

5. The method of claim 1, wherein at least one picture of the second set of temporal layers is predicted from a reference picture of the first set of temporal layers.

6. The method of claim 1, further comprising providing each of the pictures of the first set of temporal layers to the neural network-based video decoder as input for use when decoding pictures in the second set of temporal layers.

7. The method of claim 1, wherein decoding the blocks of the first picture and decoding the second picture comprises decoding the first picture before decoding the second picture, the method further comprising:

determining that the second picture has a display order before a display order of the first picture; and outputting the second picture before outputting the first picture based on the second picture having the display order before the display order of the first picture.

8. A device for decoding video data, the device comprising:

a memory configured to store video data; and a processing system comprising one or more processors implemented in circuitry, the processing system being configured to:

determine that a first temporal layer identifier of a first picture of the video data is included in a first set of temporal layers;

in response to the first temporal layer identifier being included in the first set of temporal layers, decode blocks of the first picture on a block by block basis, without performing neural network-based decoding of the first picture;

determine that a second temporal layer identifier of a second picture of the video data is included in a second set of temporal layers, the second set of temporal layers being higher than the first set of temporal layers; and in response to the second temporal layer identifier being included in the second set of temporal layers, execute a neural network-based video decoder to decode the second picture, without performing block-based prediction and residual decoding of the second picture.

9. The device of claim 8, wherein the processing system is further configured to:

encode the blocks of the first picture on a block by block basis; and execute a neural network-based video encoder to encode the second picture.

10. The device of claim 9, wherein to encode the blocks of the first picture, the processing system is configured to:

for a current block of the first picture, form a prediction block using inter-prediction, intra-prediction, affine prediction, or intra block copy (IBC) mode;

form a residual block representing differences between the current block and the prediction block; and encode the residual block and prediction information used to form the prediction block.

11. The device of claim 8, wherein to decode the blocks of the first picture, the processing system is configured to:

for a current block of the blocks of the first picture, form a prediction block using one of inter-prediction, intra-prediction, affine prediction, or intra block copy (IBC) mode;

decode a residual block for the current block; and combine the prediction block with the residual block to form a decoded block for the current block.

12. The device of claim 8, wherein at least one picture of the second set of temporal layers is predicted from a reference picture of the first set of temporal layers.

13. The device of claim 8, wherein the processing system is configured to provide each of the pictures of the first set of temporal layers to the neural network-based video decoder as input for use when decoding pictures in the second set of temporal layers.

14. The device of claim 8, wherein to decode the blocks of the first picture and to decode the second picture, the processing system is configured to decode the first picture before executing the neural network-based video decoder to decode the second picture, and wherein the processing system is further configured to:

determine that the second picture has a display order before a display order of the first picture; and output the second picture before outputting the first picture based on the second picture having the display order before the display order of the first picture.

15. A device for decoding video data, the device comprising:

means for determining that a first temporal layer identifier of a first picture of video data is included in a first set of temporal layers;

means for decoding blocks of the first picture on a block by block basis, without performing neural network-based decoding of the first picture, in response to the first temporal layer identifier being included in the first set of temporal layers;

means for determining that a second temporal layer identifier of a second picture of the video data is included in a second set of temporal layers, the second set of temporal layers being higher than the first set of temporal layers; and means for decoding the second picture using a neural network-based video decoder, without performing block-based prediction and residual decoding of the second picture, in response to the second temporal layer identifier being included in the second set of temporal layers.

16. The device of claim 15, further comprising:

means for encoding the blocks of the first picture on a block by block basis; and means for encoding the second picture using a neural network-based video encoder.

17. The device of claim 16, wherein the means for encoding the blocks of the first picture includes:

means for forming a prediction block using inter-prediction, intra-prediction, affine prediction, or intra block copy (IBC) mode for a current block of the first picture;

means for forming a residual block representing differences between the current block and the prediction block; and means for encoding the residual block and prediction information used to form the prediction block.

18. The device of claim 15, wherein the means for decoding the blocks of the first picture includes:

means for forming a prediction block using one of inter-prediction, intra-prediction, affine prediction, or intra block copy (IBC) mode for a current block of the blocks of the first picture;

means for decoding a residual block for the current block; and means for combining the prediction block with the residual block to form a decoded block for the current block.

19. The device of claim 15, further comprising means for providing each of the pictures of the first set of temporal layers to the neural network-based video decoder as input for use when decoding pictures in the second set of temporal layers.

20. The device of claim 15, wherein the means for decoding the blocks of the first picture is configured to decode the blocks of the first picture before the means for decoding the second picture decodes the second picture, further comprising:

means for determining that the second picture has a display order before a display order of the first picture; and means for outputting the second picture before outputting the first picture based on the second picture having the display order before the display order of the first picture.

* * * * *